United States Patent [19]

Saito et al.

[11] Patent Number: 4,924,193
[45] Date of Patent: May 8, 1990

[54] VOLUME CONTROL CIRCUIT FOR USE IN PORTABLE TELEPHONE OR THE LIKE

[75] Inventors: Akio Saito, Tokyo; Masahiro Ishigami, Saitama, both of Japan

[73] Assignee: NEC Corporation, Japan

[21] Appl. No.: 149,626

[22] Filed: Jan. 28, 1988

[30] Foreign Application Priority Data

Jan. 30, 1987 [JP]  Japan .................................. 62-18189

[51] Int. Cl.⁵ .......................... H03G 3/18; H04B 1/00
[52] U.S. Cl. ...................................... 330/284; 381/86
[58] Field of Search ............... 330/129, 278, 279, 284; 379/61, 63; 381/86; 455/238

[56] References Cited

U.S. PATENT DOCUMENTS 3,079,559  2/1963  Sehy ..................................... 455/238

FOREIGN PATENT DOCUMENTS 0093068  12/1983  Japan .
0179089  4/1984  Japan .

OTHER PUBLICATIONS

Kobayashi, K. et al., "Detachable Mobile Radio Units for the 800 Mhz Land Mobile Radio System", 34th IEEE Vehicular Technology Conference, May 21, 1984, pp. 6–11.

*Primary Examiner*—Steven Mottola
*Attorney, Agent, or Firm*—Laff, Whitesel, Conte & Saret

[57] ABSTRACT

A volume control circuit for a portable telephone set has two volume setting circuits. One of these circuits is activated when the telephone is used within a vehicle and the other is activated when the telephone is removed from the vehicle and carried about as a personal telephone. One embodiment selects between these two circuits by operating mechanical structures which are moved between two positions by physically attaching or removing the telephone to or from the vehicle. Another embodiment uses a microprocessor to make the selection responsive to the operation of a magnetically actuated reed switch.

13 Claims, 5 Drawing Sheets

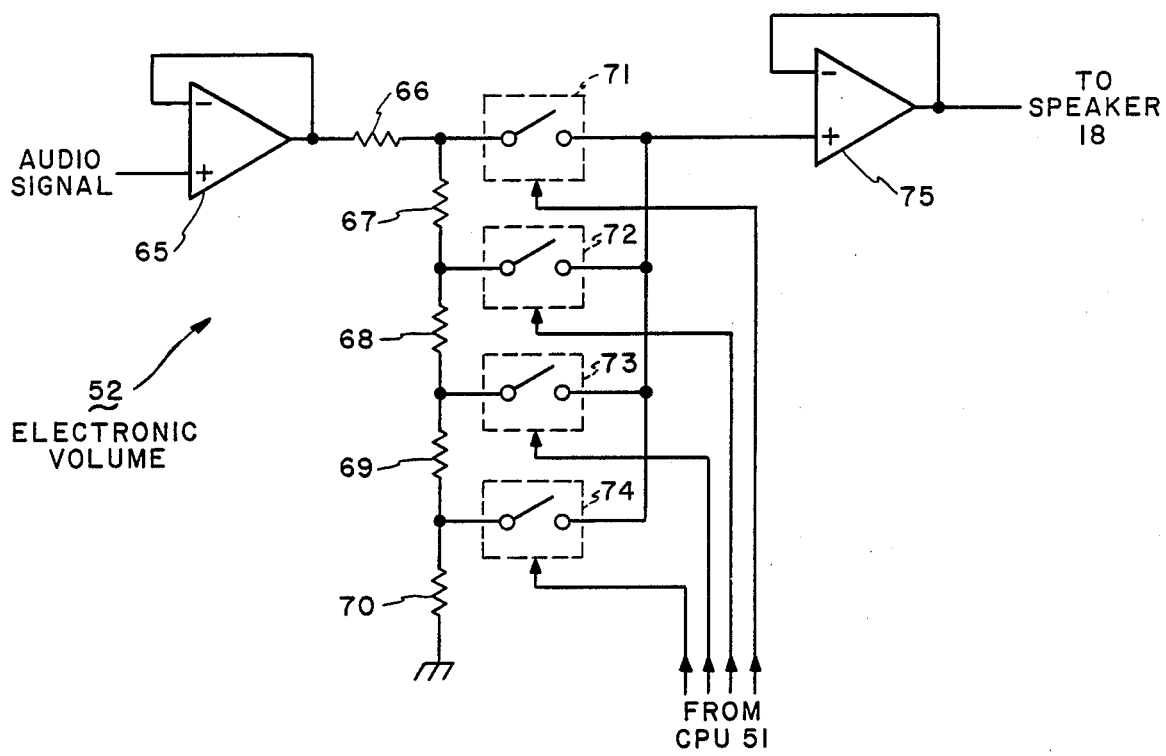
FIG. 7
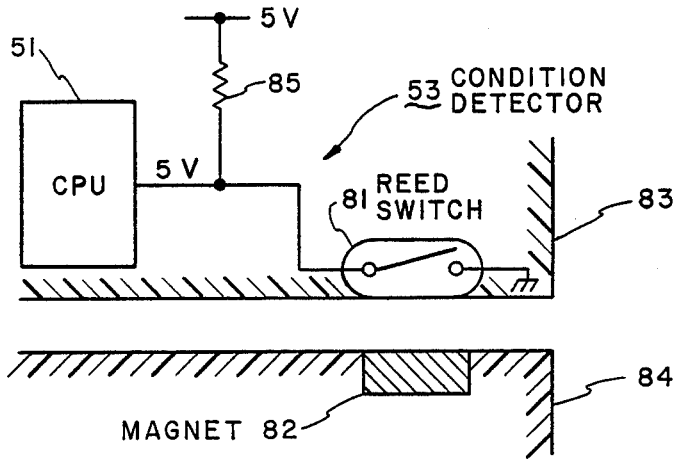
FIG. 8A PORTABLE
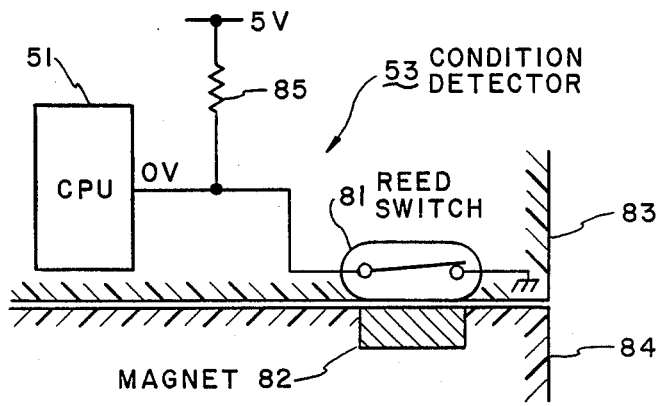
FIG. 8B ONBOARD

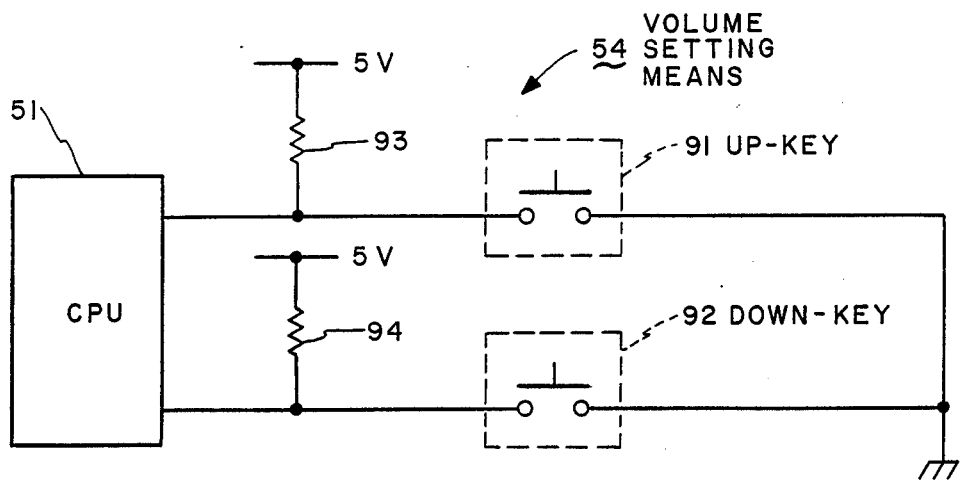
FIG. 9
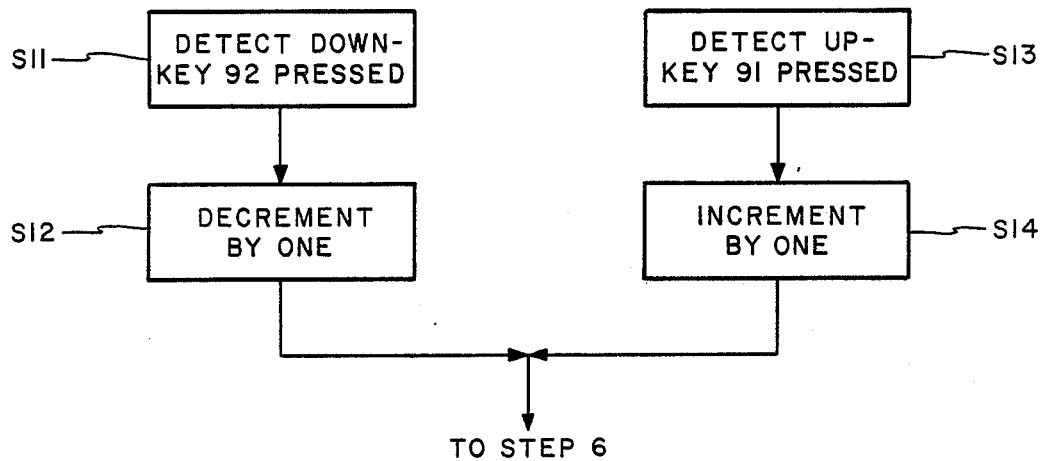
FIG. 10
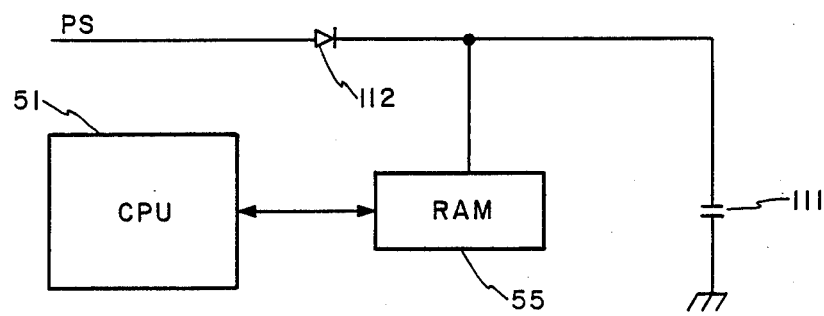
FIG. 11 RAM BACK-UP MEANS

VOLUME CONTROL CIRCUIT FOR USE IN PORTABLE TELEPHONE OR THE LIKE

BACKGROUND OF THE INVENTION

The present invention relates to a volume control circuit and, mpre particularly, to a volume control circuit which is applicable to a portable, vehicle-mounted telephone and to other equipment which are usable in any desired location.

A portable telephone, for example, is designed to be usable inside and outside of a motor vehicle, as desired. Usually, it has a volume control circuit to facilitate communications at an optimal sound level with no regard to the environment, i.e. both in the inside and the outside of a motor vehicle. Specifically, the sound level is raised while the telephone is used at a fixed position in a vehicle compartment (hereinafter referred to an "onboard condition"), which suffers from much noise, and is lowered while it is carried by a person outside of the vehicle compartment (hereinafter referred to as a "portable condition").

A drawback with a prior art volume control circuit is that the sound level has to be adjusted every time the condition under which the telephone is used is changed, as mentioned above. This level adjustment adds to the labor required for communication and, therefore, makes the telephone inconvenient to use.

SUMMARY OF THE INVENTION

It is, therefore, an object of the present invention to provide a volume control circuit which is convenient to use.

Another object of the present invention is to provide a volume control circuit which frees a person from the need for adjusting the sound level every time the environment changes.

It is another object of the present invention to provide a volume control circuit which is capable of automatically controlling the sound level depending upon the condition of use of equipment into which the circuit is built.

It is another object of the present invention to provide a volume control circuit which is suitable for use with a transportable type mobile telephone.

The inventive volume control circuit includes amplifier means for amplifying an audio signal, and first and second holding means for holding the gain of the amplifier means at a first and a second predetermined value, respectively. Condition detector means produce a condition detect signal depending upon a condition in which the equipment accompanying the circuit is used. In response to the detect signal, switch means enables one of the first and second holding means, whereby the sound level is automatically controlled in a matching relationship to the condition of the equipment usage.

BRIEF DESCRIPTION OF THE DRAWINGS

The above an other objects, features and advantages of the present invention will become more apparent from the following detailed description taken with the accompanying drawings in which:

FIG. 7 is a circuit diagram representative of a specific construction of an electronic volume which is included in the circuit of FIG. 5;

FIGS. 8A and 8B are schematic views showing a specific construction of a condition detector which is included in the circuit of FIG. 5;

FIG. 9 is a diagram schematically showing a specific construction of volume setting means which is also included in the circuit of FIG. 5;

FIG. 10 is a flowchart explaining the operation of a controller which is associated with the means of FIG. 9; and FIG. 11 is a circuit diagram which is representative of back-up means associated with a RAM (random access memory) of FIG. 5.

DETAILED DESCRIPTION OF THE INVENTION

Figure 1:
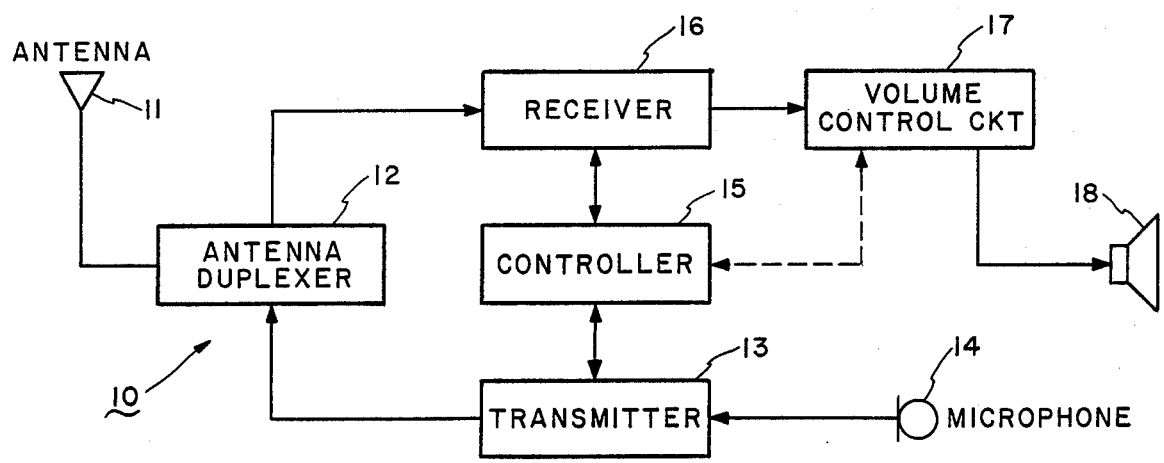
FIG. 1 is a schematic block diagram showing a portable vehicle-mounted telephone to which the present invention is applicable.

In FIG. 1, a portable telephone, generally 10, may be selectively used when in a fixed position within a motor vehicle, or in an onboard condition, and when carried by a person outside of the motor vehicle, or portable condition. The portable telephone 10 may communicate with ordinary subscriber telephones and other portable telephones via a base station (not shown), which is connected to a public telephone network.

Voice signals entering a microphone 14 are subject to frequency modulation (FM) or the like, and frequency conversion into a radio frequency, at a transmitter 13. The output of transmitter 13 is applied to an antenna 11 via an antenna duplexer 12 to be transmitted to the base station. On the other hand, a signal from the base station comes in through the antenna 11 and is routed to a receiver 16 by way of the duplexer 12. The receiver 16 subjects the received signal to frequency conversion and to other processing, then demodulates it to produce an audio signal. The audio signal is fed to a speaker 18 via a volume control circuit 17, which embodies the present invention.

The volume control circuit 17 automatically controls the level of the audio signal in a matching relation to a particular condition in which the telephone 10 is used, as decribed in detail below. For example, the volume control circuit 17 raises the sound level while the telephone 10 is used in the onboard condition and lowers it while it is used in the portable condition, although it is also capable of controlling the sound level in the opposite manner depending upon the ambient noise condition.

A controller 15 controls the transmission and reception of various kinds of control signals from the base station, and tunes the transmitter 13 and receiver 16 to a desired channel, while performing other and various kinds of control. In a second embodiment of the present invention which will be described, the controller 15 may control the volume control circuit 17 as schematically represented by a dotted line.

Figure 2:
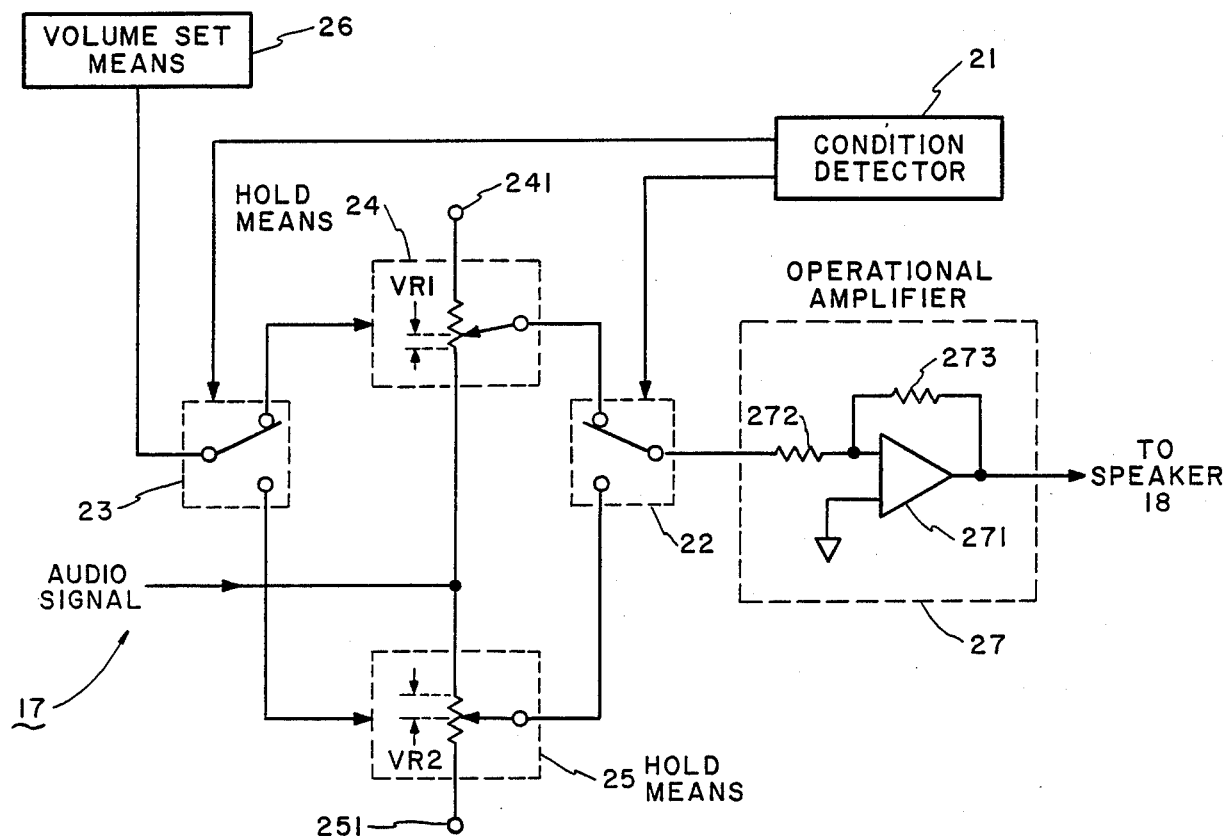
FIG. 2 is a schematic block diagram showing a volume control circuit embodying the present invention.
Figure 4C:
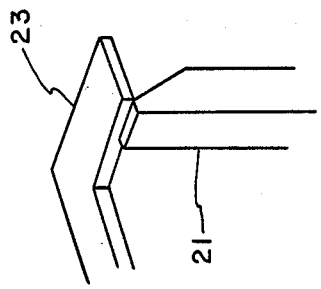
FIGS. 3A, 3B and 3C and FIGS. 4A, 4B and 4C are views schematically showing essential parts of the circuit of FIG. 2.

Referring to FIG. 2, the volume control circuit 17, in accordance with the present invention, is shown in a block diagram. The audio signal from the receiver 16 (FIG. 1) is fed to an operational amplifier (OP AMP) 27 via first volume holding means 24 or second volume holding means 25 each of which comprises a variable resistor. The OP AMP 27 includes a differential amplifier 271, an input resistor 272, and a feedback resistor 273. The output of the OP AMP 27 is applied to the speaker 18 (FIG. 1).

In response to an output of a condition detector 21, a switch 22 determines whether to pass the audio signal through the first volume holding means 24 or to pass it through the second volume holding means 25. The condition detector 21 actuates the switch 22 depending upon the condition of usage of the telephone 10 (FIG. 1), i.e., the onboard condition or the portable condition, as described later. Further, the condition detector 21 controls a switch 23 which is adapted to connect volume setting means 26 to either one of the first or second volume holding means 24 and 25. The volume setting means 26, as stated later, is a means for changing the resistance values VR1 and VR2 of the first and second volume holding means 24 and 25. One end 241 of the volume holding means 24 and the other end 251 of the volume holding means 25 are open-circuited.

When the telephone 10 is in the onboard condition, the condition detector 21 controls the switches 23 and 22 to connect both of the volume setting means 26 and OP AMP 27 to the first volume holding means 24. When the telephone 10 is in the portable condition, detector 21 control the switches 23 and 22 to connect the means 26 and OP AMP 27 to the second volume holding means 25. When the OP AMP 27 is held in connection with the first volume holding means 24, the input resistance of the amplifier 271 is the sum of the resistance of the resistor 272 and the set resistance (VR1) of the holding means 24. Similarly, when the OP AMP 27 is in connection with the second volume holding means 25, the input resistance of the amplifier 271 is the sum of the resistance of the resistor 272 and the set resistance VR2 of the holding means 25. Since the gain of the amplifier 271 is dependent upon the ratio between the input resistance and the feedback resistance, the amplification ratio of the audio signal is determined by selected one the resistance values VR1 and VR2 of the holding means 24 and 25, respectively. This causes the sound level or volume of the audio signal to be automatically adjusted to suit a particular condition of use of the telephone 10.

Figure 3C:
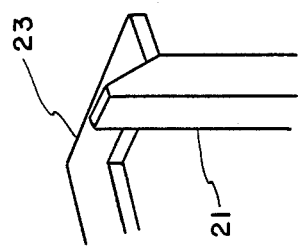
Figure 3B:
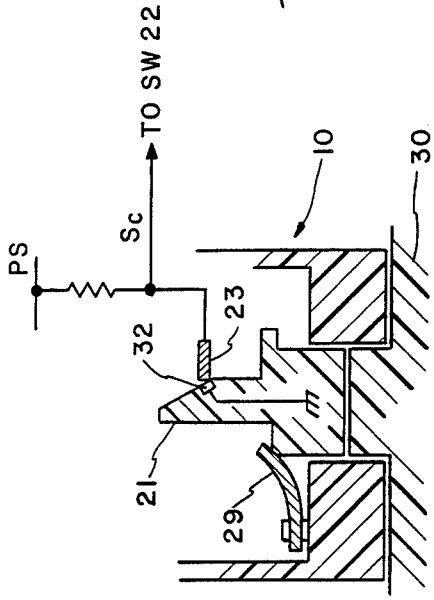
Figure 3A:
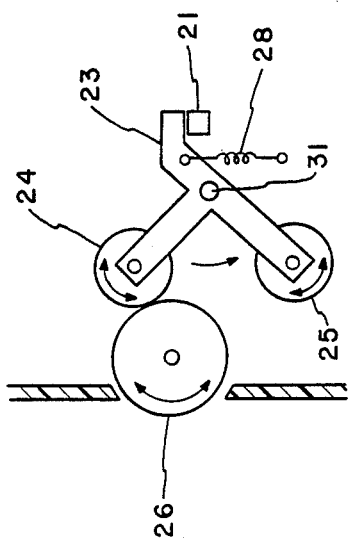

FIGS. 3A to 3C show specific constructions of the switches 22 and 23, condition detector 21, and volume holding means 24 and 25. The conditions shown in these figures apply when the telephone 10 is used in the onboard condition. As shown, a knob 26 constitutes the volume setting means and is held in toothed engagement with the first volume holding means 24 when the knob 26 is rotated it rotates the holding means 24 so as to change the set value of the holding means 24. The holding means 24 is constituted by a resistance volume which, per se, is well known in the art. When the telephone 10 is fixed to a mount 30 of, for example, a motor vehicle as shown in FIG. 3B, the condition detector (plunger) 21 is forced upward to in turn rotate the switch 23 about a shaft 31 (FIG. 3A) by leverage to the position shown in FIG. 3A. At the time, a metal plate or pattern 32 provided on the plunger 21 and the switch 23 are brought into contact with each other. The switch 23 is made of a conductive material and is connected to a power source line PS, so that a control signal Sc to the switch 22 is maintained at ground potential, thereby connecting the hold means 24 to the amplifier 27 as shown in FIG. 2.

Figure 4B:
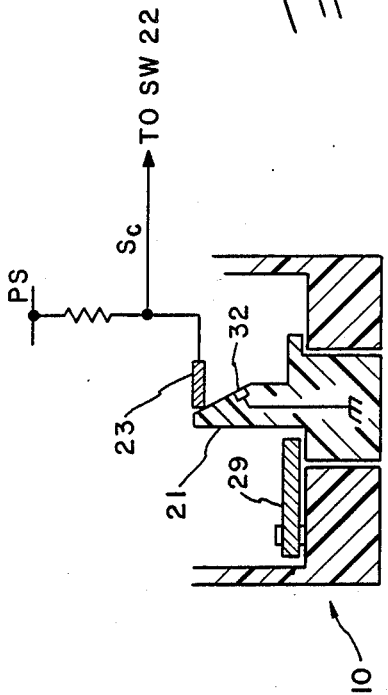
Figure 4A:
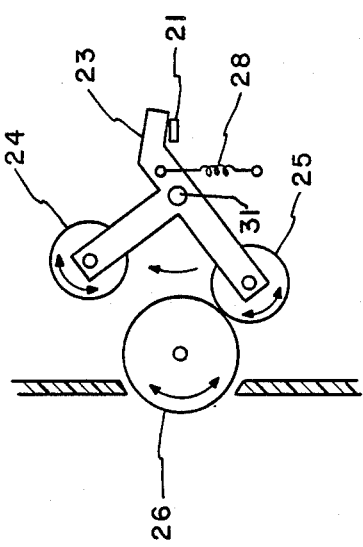

When the telephone 10 is removed from the mount 30 as shown in FIG. 4B, the plunger 21 is forced downwardly by the action of a leaf spring 29. As a result, the switch 23 is urged clockwise by a spring 28 (FIG. 4A) until it becomes fixed at the position of FIG. 4A. Simultaneously, the switch 23 is moved away from the ground pattern 32 resulting in the control signal Sc being switched to a power source voltage, e.g., +5 volts to actuate the switch 22, thereby connecting the hold means 25 to the amplifier 27. Since the knob 26 is connected to the second volume holding means 25, the set value of the holding means may be changed.

Figure 5:
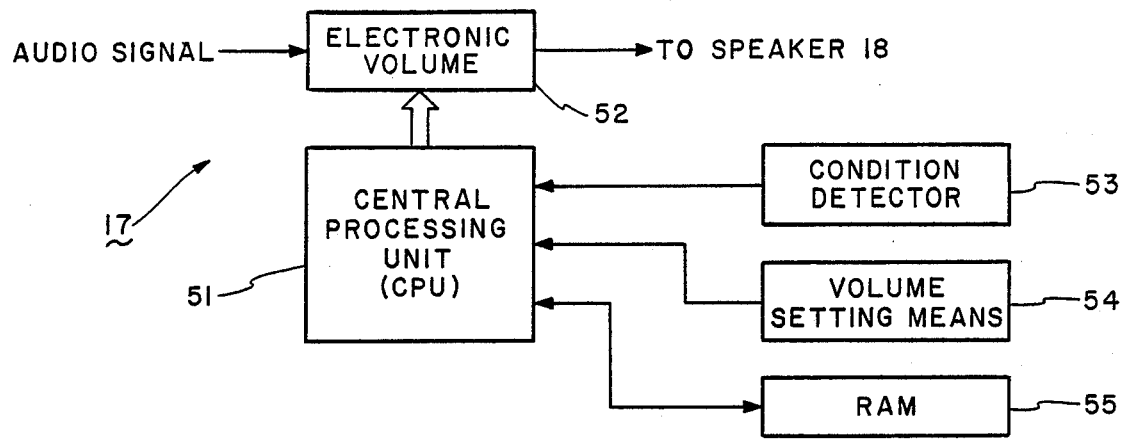
FIG. 5 is a schematic block diagram showing another embodiment of the present invention.

Referring to FIG. 5, another embodiment of the present invention is shown and make up of a CPU (central processing unit) 51, an electronic volume 52, a condition detector 53, volume setting means 54, and a RAM (random access memory) 55. The CPU 51 may be constituted by the controller 15 (FIG. 1) of the telephone 10 and implemented with, for example, $\mu$PD70008 manufactured and marketed by NEC Corporation. The operation of the volume control circuit will now be described with reference to FIG. 6.

When power is switched on in the telephone 10 (Step S1 FIG. 6), the condition detector 53 (Step S2) determines whether telephone 10 is in the onboard condition or in the portable condition and gives an output signal indicating such condition. If it is in the onboard condition, the program advances to Step S3 for controlling the electronic volume 52 to a particular value which is stored in a first memory area of the RAM 55 which is associated with the onboard use of the telephone 10. When the telephone 10 is in the portable condition as decided in Step S2, the flow advances to Step S4 so that the electronic volume 52 is controlled to another particular value which is stored in a second memory area of the RAM 55 which is associated with the portable use. In this manner, a different optimal sound level is set up for each of the onboard use and portable use of the telephone 10.

A procedure which occurs in response to a change in set sound level is as follows. When the volume setting means 54 is operated (Step S5) to change a set sound level, the CPU 51 determines whether the telephone 10 is in the onboard condition in response to or in the portable condition the output signal of the conditoon detector 53 (Step S6). If the telephone is in the onboard condition, the program advances to Step S7 for storing in the first memory area of the RAM 55 a particular onboard value which is associated with a change signal from the volume setting means 54, whereby a sound level for onboard use is set. Step S7 is followed by Step S3.

When the telephone 10 is in the portable condition as decided in Step S6, Step S8 is executed to store in the second memory area of the RAM 55 a portable value wich is associated with the change signal. This sets another particular sound level for portable use. The Step S8 is followed by Step S4.

As shown in FIG. 11, the RAM 55 is backed up by a super-capacitor 111, or the like, so that it maintains the values stored therein even if the power of the telephone 10 is turned off. In FIG. 11, the reference numeral 112 designates a diode which is connected to the power source line for eliminating reverse current flow.

Referring to FIG. 7, the electronic volume circuit 52 is schematically shown. An audio signal is amplified by a first amplifier 65 to a predetermined level and, then, is applied to a resistance division circuit 66 to 70. A first to a fourth switch 71 to 74 are so controlled as to change the division ratio of the audio signal, the resulting audio signal being applied to a second amplifier 75. Changing the division ratio of an audio signal causes the sound level to change. The control over the switches 71 to 74 is effected by the CPU 51 (FIG. 5) on the basis of set values which are stored in the RAM 55. The output of the amplifier 75 is applied to the speaker 18.

FIGS. 8A and 8B show a specific construction of the condition detector 53 (FIG. 5). As shown, a reed switch 81 is located adjacent to the outer periphery of a housing 83 of the telephone 10 while a magnet 82 is associated with the reed switch 81 and is provided on a mount 84 of a motor vehicle. The reed switch 81 is connected at one end to a power source voltage of +5 volts and to the CPU 51 via a pull-up resistor 85, at the other end, reed switch 81 is connected to ground. As shown in FIG. 8A, when the telephone 10 is in the portable use, the reed switch 81 is open so that the power source voltage +5 volts is applied to the CPU 51 which, therefore, detects the portable use of the telephone 10.

As shown in FIG. 8B, when the telephone 10 is in the onboard condition, the reed switch 81 is closed responsive to its proximity to magnet 82 to apply ground potential to the CPU 51, thus allowing the CPU 51 to detect the onboard use of the telephone 10.

Referring to FIG. 9, a specific construction of the volume setting means 54 (FIG. 5) is shown as being constituted by a push-type up-key 91 for raising the sound level and a push-type down-key 92 for lowering it. The up-key 91 is connected at one end to the CPU 51 and, via a pull-up resistor 93, to the power source voltage (+5 volts). At the other end, key 91 is connected to ground. Likewise, the down-key 92 is connected at one end to the CPU 51 and, via a pull-up resistor 94, to the power source voltage. At the other end, key 92 is connected to ground.

Figure 6:
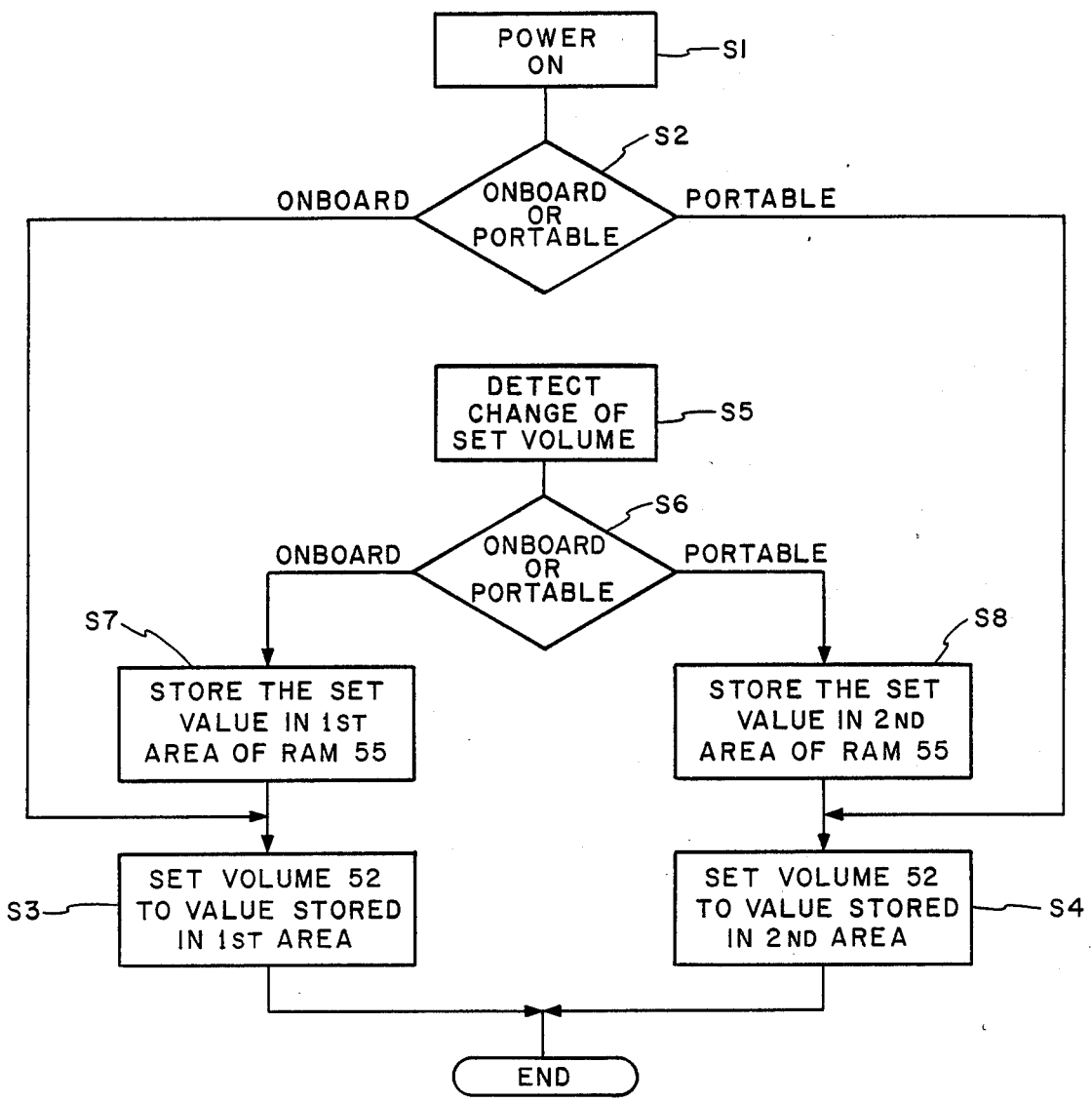
FIG. 6 is a flowchart explaining the operation of the circuit of FIG. 5.

When none of the up- and down-keys 91 and 92 are pressed, the power source voltage is continuously applied to the CPU 51. When either one of the keys 91 and 92 is pressed, ground potential is applied through that key to the CPU 51. Detecting any of such voltages, the CPU 51 executes Step S5 (FIG. 6) for detecting the change in set sound level. More specifically, as shown in FIG. 10, when the CPU 51 detects the depression of the down-key 92, it decrements the set value by 1 (one) and, then, the flow advances to Step S6 (FIG. 6). Upon detection of the depression of the up-key 91, the CPU 51 increments the set value by 1 and, then, the flow advances to Step S6.

In summary, it will be seen that a volume control circuit of the present invention is capable of changing the sound level automatically in association with the condition in which a portable vehicle-mounted telephone or like equipment, is used, thereby promoting the convenient use of such equipment.

What is claimed is

1. A volume control circuit comprising:
   amplifier means for amplifying an audio signal;
   first and second holding means for holding the gain of said amplifier means at a first and second predetermined value, respectively;
   condition detector means for producing a condition detect signal in response to a detection of a condition of use of equipment which incorporates said circuit; and
   switch means for selectively enabling one of said first and second holding means in response to said condition detect signal, said condition detector means comprising a plunger which is movable when operated from outside said equipment.

2. A volume control circuit comprising:
   volume means responsive to a control signal for setting a level of an audio signal at a predetermined value;
   condition detector means for outputting condition signals, each of which condition signals is associated with a different one of a plurality of conditions of use of equipment which incorporates said circuit;
   setting means for setting a plurality of predetermined values, each of which values is individually associated with a respective one of said plurality of conditions of use;
   store means for storing said plurality of predetermined values; and
   control means responsive to any one of said condition signals for reading one of said predetermined values which is associated with said one condition signal out of said stored means and feeding said one predetermined value to said volume means as said control signal, said equipment comprising a vehicle-mounted telephone, and said plurality of conditions of use comprise an onboard use condition and a portable use condition.

3. A volume control circuit as claimed in claim 2, wherein said condition detector means comprises a reed switch which is close to a magnet when said telephone is in said onboard condition, said reed switch opening or closing in response to its proximity to said magnet.

4. A volume control circuit comprising:
   volume means responsive to a control signal for setting a level of an audio signal at a predetermined value;
   condition detector means for outputting condition signals, each of which condition signals is associated with a different one of a plurality of conditions of use of equipment which incorporates said circuit;
   setting means for setting a plurality of predetermined values, each of which values is individually associated with a respective one of said plurality of conditions of use;
   store means for storing said plurality of predetermined values; and
   control means responsive to any one of said condition signals for reading one of said predetermined values which is associated with said one condition signal out of said stored means and feeding said one predetemined value to said volume means as said control signal, said setting means comprises an up-key and a down-key, each key being connected at one end to ground and at the other end to a power source voltage.

5. A volume control circuit comprising:
   volume means responsive to a control signal for setting a level of an audio signal at a predetermined value;
   condition detector means for outputting condition signals, each of which condition signals is associated with a different one of a plurality of conditions of use of equipment which incorporates said circuit;

setting means for setting a plurality of predetermined values, each of which values is individually associated with a respective one of said plurality of condition of use;

store means comprising a RAM (random access memory) for storing said plurality of predetermined values;

control means responsive to any one of said condition signals for reading one of said predetermined values which is associated with said one condition signal out of said stored means and feeding said one predetermined value to said volume means as said control signal; and back-up means for backing up said RAM.

6. A volume control circuit as claimed in claim 5, wherein said back-up means comprises a super-capacitor.

7. A volume control circuit comprising:
store means comprising a RAM for storing a number of desired sound levels each being associated with a respective one of a plurality of conditions of use of equipment which incorporates said circuit;

condition detector means for producing a detect signal in response to a detection of any of said conditions of use;

means for reading one of said sound levels which is associated with said detect signal out of said store means and delivering said one sound level as a volume control signal; and volume means responsive to said volume control signal for controlling the level of an audio signal, and;

back-up means for backing up said RAM.

8. A volume control circuit as claimed in claim 7 wherein said back-up means comprises a super-capacitor.

9. A volume control circuit comprising:
store means for storing a number of desired sound levels, each of said levels being associated with a respective one of a plurality of conditions of use of equipment which incorporates said circuit;

condition detector means for producing a detect signal in response to its detection of any of said conditions of use;

means for reading one of said sound levels which is associated with said detect signal out of said store means and delivering said one sound level as a volume control signal; and volume means responsive to said volume control signal for controlling the level of an audio signal, said equipment comprising a vehicle-mounted telephone, and said plurality of conditions of use comprise an onboard condition and a portable condition.

10. A volume control circuit as claimed in claim 9, wherein said condition detector means comprises a reed switch which is adjacent a magnet when said telephone is in said onboard condition, said reed switch opening or closing in response to the distance between said reed switch and said magnet.

11. A volume control circuit comprising:
store means for storing a number of desired sound levels, each of said levels being associated with a respective one of a plurality of conditions of use of equipment which incorporates said circuit;

condition detector means for producing a detect signal in response to its detection of any of said conditions of use;

means for reading one of said sound levels which is associated with said detect signal out of said store means and delivering said one sound level as a volume control signal;

volume means responsive to said volume control signal for controlling the level of an audio signal; and setting means comprising an up-key and a down-key, each of said keys being connected at one end to ground and at the other end to a power source voltage.

12. A method of setting a level of an audio signal in association with a condition of use of equipment, comprising the steps of:
deciding whether said equipment is in an onboard condition or in a portable condition, after power is turned on in said equipment;

when said equipment is in said onboard condition, setting the level of said audio signal at a first predetermined value which is individually associated with said onboard condition;

when said equipment is in said portable condition, setting the level of said audio signal at a second predetermined value which is individually associated with said portable condition;

detecting a change signal for changing any of said first and second predetermined values;

deciding whether said equipment is in said onboard condition or in said portable condition, after said change signal has been detected;

when said equipment is in said onboard condition as decided after the detection of said change signal, changing said first predetermined value is associated with said change signal; and when said equipment is in said portable condition as decided after the detection of said change signal, changing said second predetermined value associated with said change signal.

13. A method of setting a level of an audio signal in association with a condition of use of equipment, comprising the steps of:
deciding whether said equipment is in said onboard condition or in a portable condition, after power is turned on in said equipment;

when said equipment is in said onboard condition, setting the level of said audio signal at a first predetermined value which is individually associated with aid onboard condition;

when said equipment is in said portable condition, setting the level of said audio signal at a second predetermined value which is individually associated with said portable condition;

detecting depression of an up-key;

detecting depression of a down-key;

outputting in response to a detection of said depression of said up-key a signal incremented by one as said change signal; and outputting in response to a detection of said depression of said down-key a signal decremented by one as said change signal.

* * * * *